United States Patent [19]

Ban et al.

[11] Patent Number: 4,498,219
[45] Date of Patent: Feb. 12, 1985

[54] METHOD OF CONSTRUCTING A FIBER-REINFORCED PISTON FOR INTERNAL COMBUSTION ENGINES

[75] Inventors: Keisuke Ban, Fujimi; Akimasa Daimaru, Oomiya, both of Japan

[73] Assignee: Honda Giken Kogyo Kabushiki Kaisha, Tokyo, Japan

[21] Appl. No.: 388,666

[22] Filed: Jun. 15, 1982

[30] Foreign Application Priority Data

Jun. 18, 1981 [JP] Japan .................................. 56-94461

[51] Int. Cl.³ ............................................. B23P 15/10
[52] U.S. Cl. ................................... 29/156.5 R; 92/212; 92/213; 92/224; 92/248; 123/193 P
[58] Field of Search ................. 92/212, 213, 222, 224, 92/248; 164/97, 98, 111, 112, 120; 428/611, 614; 264/12, 211, 349; 29/156.5 R; 123/193 P

[56] References Cited

U.S. PATENT DOCUMENTS 3,959,421  5/1976  Weber et al. .......................... 264/12

FOREIGN PATENT DOCUMENTS 0080562  6/1983  European Pat. Off. ............. 164/97
0041622  4/1978  Japan ..................................... 92/222
 669967  4/1952  United Kingdom .................. 264/12
1344286  1/1974  United Kingdom .
2033805  5/1980  United Kingdom .
2058623  4/1981  United Kingdom .

Primary Examiner—Robert E. Garrett
Assistant Examiner—Timothy E. Nauman
Attorney, Agent, or Firm—Posnack, Roberts, Cohen & Spiecens

[57] ABSTRACT

A fiber-reinforced piston for internal combustion engines, comprising a molded body of inorganic fiber forming a top land and a ring region of the piston. The molded body has a content of granulated fiber having larger particles of a particle diameter less than 100 mesh in an amount of not more than 10 weight percent with respect to the total amount of fiber used, and a light alloy matrix fills and is combined with the molded body of inorganic fiber.

3 Claims, 7 Drawing Figures

METHOD OF CONSTRUCTING A FIBER-REINFORCED PISTON FOR INTERNAL COMBUSTION ENGINES

FIELD OF THE INVENTION

This invention relates to a fiber-reinforced piston for internal combustion engines, comprising a molded body of inorganic fiber forming a top land and a ring region of the piston, and a light alloy matrix combined with the molded body of inorganic fiber.

The invention also relates to the method of producing the piston and particularly the formation of the molded body.

PRIOR ART

Metal and ceramic fibers are used as the inorganic fiber in the construction of the molded body for the piston referred to above. In view of performance, productivity and manufacturing costs of these materials, the ceramic fiber, which is sold in the market generally as a heat-insulating material, is used more advantageously. In order to manufacture the ceramic fiber, a blowing method is employed, by which ceramic fiber is obtained efficiently and economically. In this method, fiber material is melted, and the molten material is then subjected to a blowing operation with high-speed air so as to be fibrillated. Although this method is an extremely good method of obtaining inexpensive fiber, it causes the molten fiber material to be granulated during the blowing operation and the subsequent fibrillation. Consequently, the fiber obtained by this method includes portions in a granulated state. When a blanket or a molded fiber product is manufactured from such fiber, the granulated portions thereof drop and are contained as granulated fiber (generally called "shots") in the resulting blanket or molded fiber product. This granulated fiber portion is present in the final product generally in an amount not less than 50 percent by weight.

We have considered the effect of such granulated fiber portions i.e. portions with fiber granules or particles in a molded body in which ceramic fiber is used to reinforce a top land and a ring region of a light alloy piston for an internal combustion engine. We have found that the granulated fiber portions produce the following disadvantages.

In a turning process for forming grooves in a ring region of the piston, the granulated fiber causes brittle fracture thereof when a cutting tool comes into contact therewith. Accordingly, the surface obtained by the turning operation is not smooth but jagged and formed with deep notches. Therefore, fatigue of the piston is liable to start in the surfaces of the grooves in the ring. This notching effect is closely related to the particle diameter of the granulated fiber portion. Referring to FIG. 7, as the diameter of particles of fiber having a diameter of, for example, 1-3μ, increases in the region of the graph to the left of the 100-mesh value, the fatigue strength of a fiber-reinforced portion of a piston decreases substantially. This tendency is not influenced greatly by the differences in the diameter and amount of the fiber. When the edge of the cutting tool intermittently comes into contact with granulated fiber of a larger particle diameter during a turning groove-forming process, the turning resistance is increased intermittently. As a result, the edge of the cutting tool is worn rapidly. This causes decrease of the turning efficiency and turning groove-forming accuracy with respect to a fiber-reinforced portion of a piston.

SUMMARY OF THE INVENTION

An object of the present invention is to provide a fiber-reinforced piston for internal combustion engines and its method of manufacture and associated composition wherein the piston comprises a top land and a ring region which consists of a molded body of inorganic fiber, in which the particle diameter and content of granulated fibers are regulated in view of the above-mentioned problems so as to minimize the molded body-notching effect caused by the granulated fibers contained therein, and improve the turning processability and fatigue strength of the molded body, and the turning groove-forming accuracy with respect thereto.

In order to satisfy the above and further objects, the present invention provides a fiber-reinforced piston for internal combustion engines, comprising a molded body of inorganic fiber forming a top land and a ring region of the piston, said molded body having a content of granulated fiber of a particle diameter of not more than 100 mesh in an amount not more than 10 weight percent with respect to the total amount of fiber used, and a light alloy matrix filling and combined with the molded body of inorganic fiber.

The above and other objects as well as advantageous features of the invention will become apparent from the following description of preferred embodiments taken in conjunction with the accompanying drawing.

DESCRIPTION OF THE PREFERRED EMBODIMENT

Figure 1:
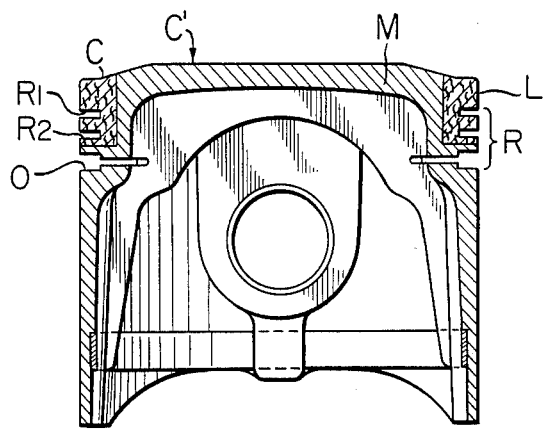
FIG. 1 is a side elevational view in longitudinal section of an embodiment of the present invention.

An embodiment of the present invention will hereafter be described in detail with reference to the drawing.

EXAMPLE

A ceramic fiber having the following properties was used.

Chemical compositions: $Al_2O_3$: 47.3 wt. %, $SiO_2$: 52.3 wt. %, Miscellaneous: 0.36 wt. %.

Length of fiber: Length of short fiber—250 mm.

Average diameter of the fiber: 2.8μ.

Melting point: 1760° C.

Maximum temperature at which the fiber is used: 1260° C.

An annular molded body having an outer diameter of 68 mm, an inner diameter of 54 mm, a depth of 20 mm and a bulk density of 0.2 g/cc was prepared from a blanket consisting of the aforesaid fiber. The total content of granulated fiber in the molded body with respect to the amount of the ceramic fiber used was 53 weight percent, and the content of granulated fiber of not more than 100 mesh therein with respect to the amount of the ceramic fiber used was 19.7 weight percent. This molded body will hereinafter be referred to as "molded body A".

The aforesaid blanket was subjected to a coarse-granulated-fiber elimination treatment consisting of a vibration method and a wet type method, to reduce the content of the granulated fiber therein to three levels, and thereby prepare three classes of blankets having different granulated fiber contents. Annular fiber-molded bodies B, C and D having the same shape and bulk density as the molded body A were prepared by using these three classes of blanket.

The content of granulated fiber and the content of granulated fiber of not more than 100 mesh in the annular fiber-molded bodies A–D with respect to the amount of the ceramic fiber used are tabulated as follows.

| Annular molded body of fiber | Total content of granulated fiber | Content of granulated fiber of not more than 100 mesh (wt. %) |
|---|---|---|
| A | 53.0 | 19.7 |
| B | 37.0 | 11.0 |
| C | 26.4 | 7.0 |
| D | 16.4 | 0.8 |

Figure 2:
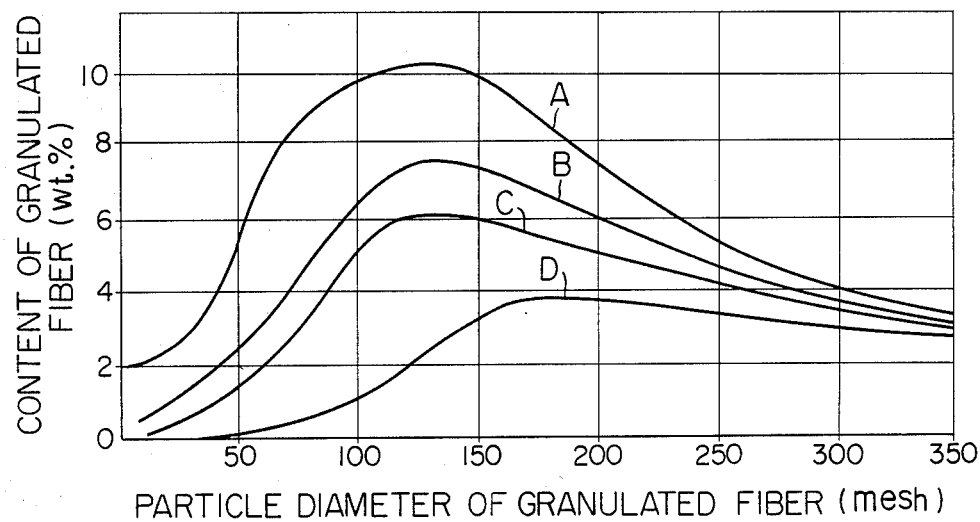
FIG. 2 is a graph showing the relation between the particle diameter of granulated fiber in a molded body of inorganic fiber and the content thereof.

FIG. 2 shows the distribution of the contents of granulated fiber of various particle diameters in the annular fiber-molded bodies A–D. The molded body having a higher total content of granulated fiber naturally has a wider range of particle diameters thereof, so that the content of granulated fiber of a larger particle diameter in the molded body is also high. In the annular fiber-molded body A, the content of granulated fiber having particle diameters of 100–150 mesh is the highest. It is necessary that the material for the molded body A be subjected to coarse-granulated-fiber elimination treatment, and that the degree of this treatment be increased. The annular fiber-molded bodies B and C have gradually smaller weight percentages of larger diameter granulated fiber, and narrower ranges of distribution of particle diameters thereof. Also, the content of granulated fiber of 150–200 mesh tends to increase. It was ascertained that, even when the degree of the coarse-granulated fiber elimination treatment is further increased, it is difficult to completely eliminate the granulated fiber of less than 100 mesh, and that a decrease in the content of granulated fiber of less than 100 mesh is in agreement with a decrease in the total content of granulated fiber.

The annular fiber-molded bodies A–D were placed in order in a piston-casting mold and cast with a magnesium alloy matrix M. Thus, four types of pistons A'–D' for an internal combustion engine were obtained each of which has a fiber-reinforced top land L and a ring region R (excluding the groove portion of an oil-sweeping ring) shown in FIG. 1. The casting was effected by a high-pressure solidification casting method.

Each of the pistons A'–D' was then subjected to a mechanical process, such as a turning process to form first and second ring-grooves $R_1$, $R_2$ and an oil-sweeping ring O. The ring-groove processing accuracy of the pistons A'–D' was thereafter compared to obtain the results shown in FIGS. 3 and 4.

Figure 3:
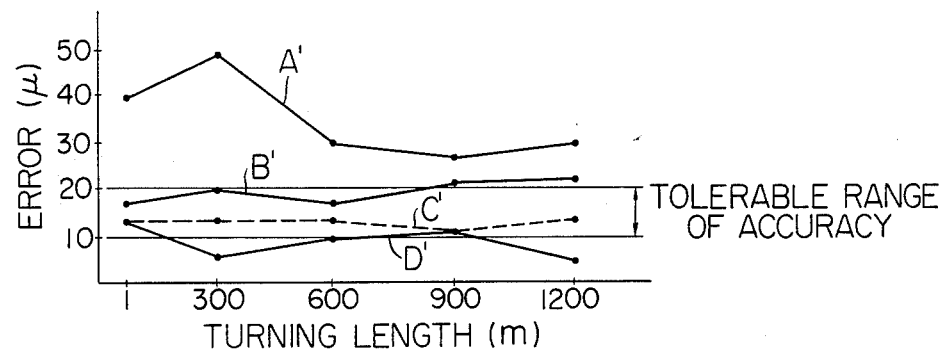
FIG. 3 is a graph showing the accuracy of the width of a groove in a ring region of a piston, and especially the relation between the turning length and error in the width of the groove in the ring region of the piston.

FIG. 3 shows the accuracy of the width of the grooves in the rings of the pistons. The accuracy of width of the grooves in the rings of the pistons B', C', D' was within the tolerable range, and the accuracy of the width of the grooves in the piston A' proved to be not allowable.

Figure 4:
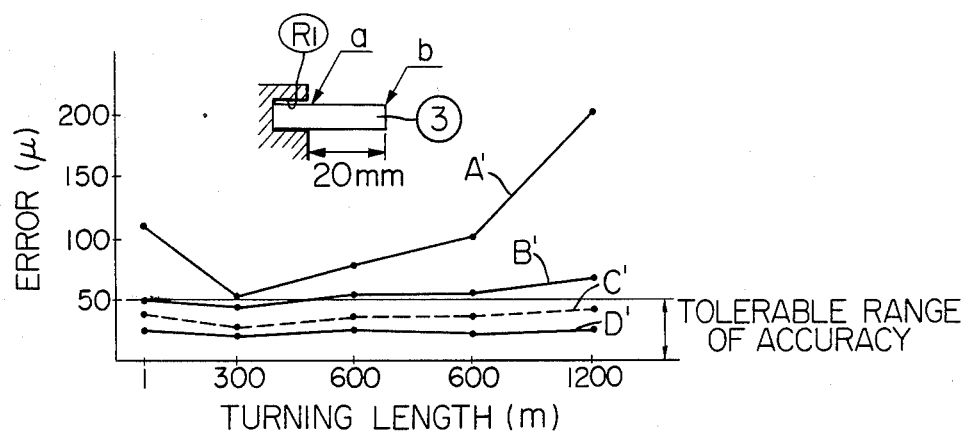
FIG. 4 is a graph showing the accuracy of horizontality of the groove in the ring region of the pistons, and especially the relation between the turning length and the error in the horizontality of the groove in the ring region of the piston.

FIG. 4 shows the accuracy of horizontality of the grooves in the rings of the four pistons. The accuracy of horizontality of the grooves in the rings of the pistons C', D' was within the tolerable range, and the accuracy of horizontality of the grooves in the rings of the pistons A', B' proved to be not allowable.

The horizontality of the grooves in the rings of the pistons is determined by bringing one end of an angular bar 3 into contact with the bottom surface of first ring-groove $R_1$, which angular bar 3 is so long that it projects 20 mm from an open end of the groove $R_1$ when the angular bar 3 is inserted into the groove $R_1$ to its full extent, and then measuring the difference between distance a between a reference plane and an upper surface of that portion of the angular bar 3 which is at the open end of the groove $R_1$, and a distance b between the reference plane and an upper edge of an outer end of the angular bar 3. The turning length shown in FIGS. 3 and 4 refers to the length of a groove which has been formed by using a turning tool.

Therefore, the pistons C', D', which are within the tolerable range with respect to the accuracy of both width and horizontality of the ring-grooves, have optimum processing accuracy. This is ascribable to the following. The content of granulated fiber of less than 100 mesh in the annular fiber-molded bodies in the pistons C', D' is regulated to be not more than 10 weight percent, so that the intermittent turning resistance encountered by the edge of the cutting tool during a ring-groove forming operation is reduced. As a result, abrasion of the edge of the cutting tool can be reduced, and the adaptability of the fiber-reinforced portions of the pistons to a turning operation can be improved to a great extent. An especially large effect can be obtained in an operation for forming a ring-groove of not more than 1.5 mm in width (axial dimension).

Figure 5:
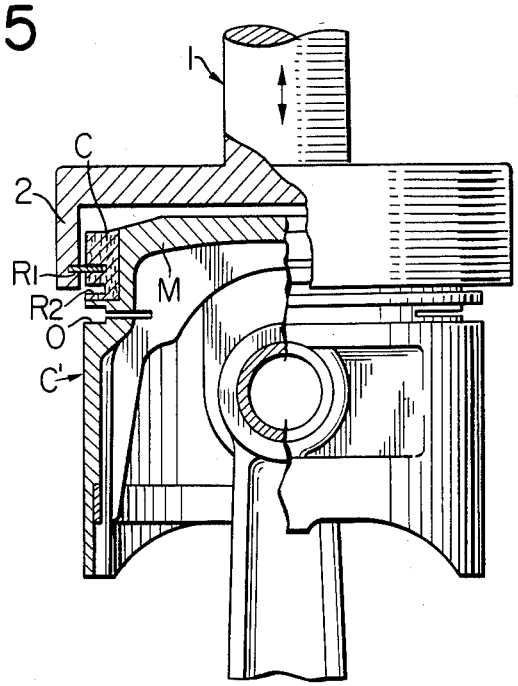
FIG. 5 diagrammatically illustrates, in section, a fatigue testing operation with respect to the molded body.

In order to subject the pistons A'–D', to fatigue tests, a chuck 2 of a simple fatigue testing machine 1 shown in FIG. 5 is inserted into the first ring-groove $R_1$ to apply a gas pressure (50 kg/cm² at maximum) equivalent load to ring-groove $R_1$ repeatedly for 400 hours, and the fatigue fracture probability is determined taking an S-N value and scatter into consideration. The results obtained are shown in FIG. 6.

Figure 6:
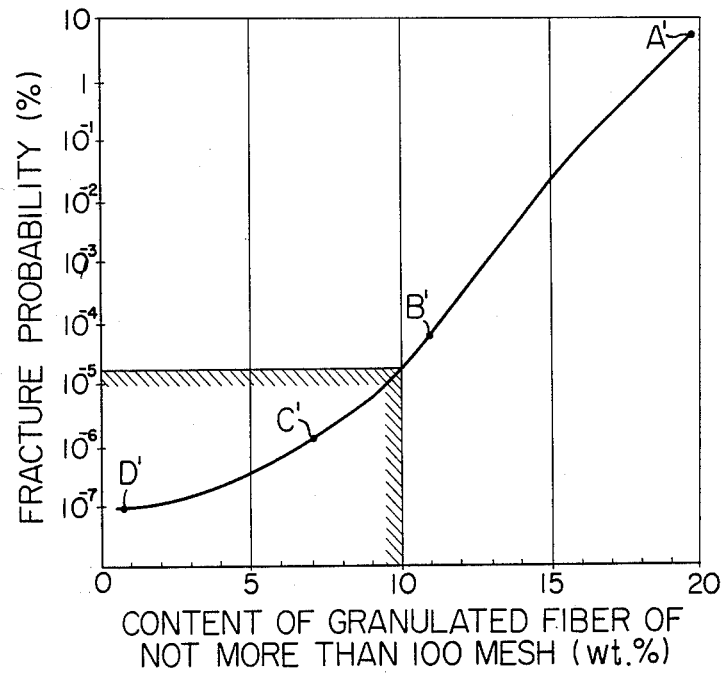
FIG. 6 is a graph showing the relation between the content of granulated fiber of not more than 100 mesh in the molded body and fracture probability.
Figure 7:
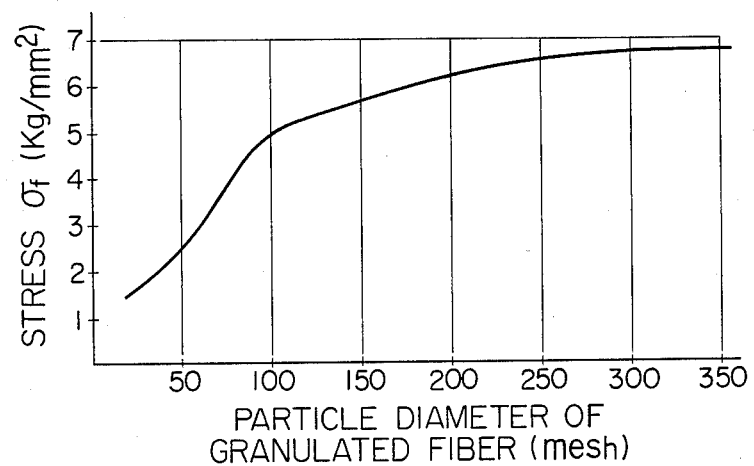
FIG. 7 is a graph showing the relation between the diameter of granulated fiber and stress thereof.

As is clear from FIG. 6, the pistons C', D', which contain not more than 10% by weight of granulated fiber having a particle diameter of not more than 100 mesh, have sufficient fatigue strength. It was discovered that, when the content of granulated fiber exceeds 10 weight percent, granulated fiber of larger particle diameters increases, so that the molded body-notching effect is increased substantially to cause the fatigue strength of the piston to decrease and the practical reliability thereof to be lost.

The present invention can employ an inorganic fiber other than the ceramic fiber which contains the same granulated fiber as the ceramic fiber.

In summary, the present invention contemplates a molded body of an inorganic fiber forming a top land and a ring region of a piston, in which molded body the content of granulated fiber of less than 100 mesh is not more than 10 weight percent with respect to the amount of the inorganic fiber used, and a light alloy matrix fills and combines with the molded body. The particle diameter and content of the granulated fiber in the present invention are regulated as aforesaid to minimize the molded body-notching effect caused by the granulated fiber, and maximize the fatigue strength of the piston. The construction of the invention also allows the turning processability of the molded body to be increased. Thus, the present invention can provide a piston having accurately processed ring-grooves. Therefore, the present invention not only permits improving the productivity of pistons but also effectively prevents compression loss, blow-by and an increase in the oil consumption in internal combustion engines.

The present invention is not, of course, limited to the above-described embodiment; and it may be modified in various ways within the scope of the appended claims.

What is claimed is:

1. In a method of producing a fiber reinforced piston of an internal combustion engine comprising forming a molded body of inorganic fiber to constitute a top land and ring region for the piston and filling the molded body with a lightweight alloy matrix to integrally join the molded body and alloy matrix, the improvement comprising forming said inorganic fiber with less than 10% by weight of fiber granules having a particle diameter less than 100 mesh from a blanket by subjecting said blanket to a coarse granulated-fiber elimination treatment consisting of a vibration method and a wet type method.

2. A method as claimed in claim 1 comprising forming annular grooves in said molded body.

3. A method as claimed in claim 2 wherein said grooves are substantially smooth and straight and provide high fatigue strength for the piston.

* * * * *